(12) United States Patent
Zhou et al.

(10) Patent No.: US 10,552,315 B2
(45) Date of Patent: Feb. 4, 2020

(54) DATA PROCESSING METHOD AND APPARATUS, AND FLASH DEVICE

(71) Applicant: HUAWEI TECHNOLOGIES CO., LTD., Shenzhen, Guangdong (CN)

(72) Inventors: Jianhua Zhou, Chengdu (CN); Po Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/927,105

(22) Filed: Mar. 21, 2018

(65) Prior Publication Data

US 2018/0210828 A1 Jul. 26, 2018

Related U.S. Application Data

(63) Continuation of application No. PCT/CN2016/100824, filed on Sep. 29, 2016.

(30) Foreign Application Priority Data

Sep. 29, 2015 (CN) .......................... 2015 1 0629175

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0616* (2013.01);
(Continued)

(58) Field of Classification Search
None
See application file for complete search history.

(56) References Cited

U.S. PATENT DOCUMENTS 8,677,054 B1    3/2014   Meir et al.
2012/0303873 A1 11/2012  Nguyen et al.
(Continued)

FOREIGN PATENT DOCUMENTS

CN   101661412 A   3/2010
CN   102023818 A   4/2011
(Continued)

OTHER PUBLICATIONS

Goossaert, "Software and Thoughts: Coding for SSDs—Part 4: Advanced Functionalities and Internal Parallelism", Dec. 2014. (Year: 2014).*

*Primary Examiner* — Ryan Bertram
*Assistant Examiner* — Trang K Ta
(74) *Attorney, Agent, or Firm* — Huawei Technologies Co., Ltd.

(57) ABSTRACT

A method for adjusting over provisioning space and a flash device are provided. The flash device includes user storage space for storing user data and over provisioning space for garbage collection within the flash device. The flash device receives an operation instruction, and then performs an operation on user data stored in the user storage space according to the operation instruction. Further, the flash device identifies a changed size of user data after performing the operation. Based on the changed size of data, a target adjustment parameter is identified. Further, the flash device adjusts the capacity of the over provisioning space according to the target adjustment parameter. According to the method, the over provisioning ratio can be dynamically adjusted.

20 Claims, 4 Drawing Sheets

(52) U.S. Cl.
CPC .......... *G06F 3/0629* (2013.01); *G06F 3/0652* (2013.01); *G06F 3/0679* (2013.01); *G06F 12/0253* (2013.01)

(56) References Cited

U.S. PATENT DOCUMENTS

| | | | |
|---|---|---|---|
| 2013/0042064 A1* | 2/2013 | Simionescu | G06F 12/0871 711/118 |
| 2014/0101379 A1 | 4/2014 | Tomlin | |
| 2014/0122787 A1 | 5/2014 | Shalvi et al. | |
| 2014/0181369 A1* | 6/2014 | Horn | G06F 12/0246 711/103 |
| 2014/0281167 A1* | 9/2014 | Danilak | G06F 3/0688 711/103 |
| 2016/0217071 A1* | 7/2016 | Hu | G06F 12/0246 |
| 2017/0083253 A1 | 3/2017 | Kowles | |
| 2017/0199682 A1 | 7/2017 | Danilak | |
| 2017/0242791 A1* | 8/2017 | Law | G06F 12/0253 |

FOREIGN PATENT DOCUMENTS

| | | |
|---|---|---|
| CN | 103309816 A | 9/2013 |
| CN | 103488575 A | 1/2014 |
| CN | 103562842 A | 2/2014 |
| CN | 103620563 A | 3/2014 |
| CN | 104102459 A | 10/2014 |
| CN | 105335100 A | 2/2016 |
| EP | 2642397 A1 | 9/2013 |
| JP | 2011505046 A | 2/2011 |
| JP | 2013200868 A | 10/2013 |
| JP | 2014513356 A | 5/2014 |
| JP | 2014179078 A | 9/2014 |
| JP | 2016507816 A | 3/2016 |

* cited by examiner

DATA PROCESSING METHOD AND APPARATUS, AND FLASH DEVICE

CROSS-REFERENCE TO RELATED APPLICATIONS

This application is a continuation of International Application No. PCT/CN2016/100824, filed on Sep. 29, 2016, which claims priority to Chinese Patent Application No. 201510629175.3, filed on Sep. 29, 2015, all of which are hereby incorporated by reference in their entireties.

TECHNICAL FIELD

The present application relates to the field of flash device technologies, and specifically, to a data processing method and apparatus, and a flash device.

BACKGROUND

A solid state disk (SSD), also called a solid state drive, is a hard disk made of a solid-state electronic storage chip array. SSDs are widely used in fields such as military, vehicles, industrial control, video surveillance, network monitoring, network terminals, electricity, medical care, aviation, and navigation devices. On the market, common SSD capacities usually include 60/64 gigabytes (GB), 120/128 GB, 240/256 GB, 480/512 GB, and 960/1024 GB. A value on the left of a slash represents a capacity available to a user, whereas a value on the right of a slash represents a physical space capacity of an SSD. A difference between the two values is called an over provisioning (OP) space. Usually, a user cannot perform an operation in the OP space, and a capacity of the OP space is usually determined by a primary controller. OP is generally used for performing an optimization operation, which includes wear balancing, garbage collection, bad block mapping, etc. An over provisioning ratio is a ratio of an over provisioning space capacity to the user available space capability, and over provisioning ratios in the industry are typically 7% and 28%. A physical space capacity of 1024 GB is used as an example. When a user available space capacity is 960 GB, a corresponding over provisioning ratio is 7%, namely, (1024−960)/960=7%. When a user available space capacity is 800 GB, a corresponding over provisioning ratio is 28%, namely, (1024−800)/800=28%. A larger over provisioning ratio corresponds to a better random write performance, a smaller performance fluctuation, and a longer service life. However, higher OP ratio means higher cost.

A flash memory in the SSD needs to be erased before being rewritten. Writing and reading are in pages while erasing is in blocks. Therefore, a volume of actually written data is much greater than that of data written by a host. Write amplification (WA) is a ratio of a volume of actually written data to a size of data written by a host. Larger WA corresponds to a smaller over provisioning ratio, a shorter service life, and poorer random write performance.

Currently, an SSD vendor provides multiple over provisioning ratios for an SSD of a specific capacity, and a user selects a fixed over provisioning ratio according to a user requirement. Once an over provisioning ratio is fixed, parameters of the SSD are fixed, and performance and a service life of the SDD are also fixed. In this way, the SSD can only run at the fixed over provisioning ratio. Consequently, it is difficult to further optimize the performance and the service life of the SSD.

SUMMARY

Embodiments of the present application provide a data processing method and apparatus, and a flash device, so as to dynamically adjust an over provisioning ratio, improve reliability and performance stability of a flash device, and prolong a service life of the flash device.

A first aspect of the embodiments of the present application provides a data processing method. The method is applied to a storage system. The storage system includes a host and a flash device. Multiple over provisioning levels are configured for physical storage space of the flash device according to different over provisioning ratios. Each over provisioning level corresponds to an interval of a user storage space capacity. Each interval of the user storage space capacity corresponds to a different adjustment parameter. The over provisioning ratio is a ratio of an over provisioning space capacity to the user storage space capacity, and the over provisioning space capacity is a difference between a physical storage space capacity and the user storage space capacity. The method is performed by the flash device and includes:

receiving an operation instruction from the host, performing, according to the operation instruction, an operation on data stored in the flash device, and determining a size of data that is obtained after the operation and that is saved in the flash device by a user;

determining a target over provisioning level according to the size of the data that is obtained after the operation and that is saved in the flash device by the user and the interval that is of the user storage space capacity and that corresponds to each over provisioning level;

determining a target adjustment parameter according to the target over provisioning level and a correspondence between each over provisioning level and an adjustment parameter; and adjusting the over provisioning space capacity of the flash device according to the target adjustment parameter.

In a first possible implementation of the first aspect of the embodiments of the present application, the receiving an operation instruction from the host, performing, according to the operation instruction, an operation on data stored in the flash device, and determining a size of data that is obtained after the operation and that is saved in the flash device by a user includes:

receiving a write instruction from the host, and determining to-be-added data according to the write instruction; and adding the to-be-added data to the flash device, and determining, as the size of the data that is obtained after the operation and that is saved in the flash device by the user, a size of data that is obtained after the to-be-added data is added to the flash device and that is saved by the user.

In a second possible implementation of the first aspect of the embodiments of the present application, the receiving an operation instruction from the host, performing, according to the operation instruction, an operation on data stored in the flash device, and determining a size of data that is obtained after the operation and that is saved in the flash device by a user includes:

receiving a delete instruction from the host, and determining to-be-deleted data according to the delete instruction; and deleting the to-be-deleted data from the flash device, and determining, as the size of the data that is obtained after the operation and that is saved in the flash device by the user, a size of data that is obtained after the to-be-deleted data is deleted and that is saved by the user.

With reference to the first possible implementation of the first aspect of the embodiments of the present application, in a third possible implementation of the first aspect of the embodiments of the present application, before the adding the to-be-added data to the flash device, the method further includes:

compressing the to-be-added data, where the to-be-added data is compressed data.

With reference to any one of the first to the third possible implementations of the first aspect of the embodiments of the present application, in a fourth possible implementation of the first aspect, after the step of adjusting the over provisioning space capacity of the flash device according to the target adjustment parameter, the method further includes:

performing, according to a target garbage collection adjustment parameter in the target adjustment parameter, garbage collection processing on the data stored in the flash device.

With reference to any one of the first to the third possible implementations of the first aspect of the embodiments of the present application, in a fifth possible implementation of the first aspect, after the step of adjusting the over provisioning space capacity of the flash device according to the target adjustment parameter, the method further includes:

performing, according to a target wear leveling adjustment parameter in the target adjustment parameter, wear leveling processing on the data stored in the flash device.

A second aspect of the embodiments of the present application provides a data processing apparatus. The data processing apparatus is applied to a flash device in a storage system. The storage system further includes a host. Multiple over provisioning levels are configured for physical storage space of the flash device according to different over provisioning ratios. Each over provisioning level corresponds to an interval of a user storage space capacity. Each interval of the user storage space capacity corresponds to a different adjustment parameter. The over provisioning ratio is a ratio of an over provisioning space capacity to the user storage space capacity, and the over provisioning space capacity is a difference between a physical storage space capacity and the user storage space capacity. The data processing apparatus includes:

a receiving unit, configured to: receive an operation instruction from the host, perform, according to the operation instruction, an operation on data stored in the flash device, and determine a size of data that is obtained after the operation and that is saved in the flash device by a user;

a determining unit, configured to determine a target over provisioning level according to the size of the data that is obtained after the operation and that is saved in the flash device by the user and the interval that is of the user storage space capacity and that corresponds to each over provisioning level, where the determining unit is further configured to determine a target adjustment parameter according to the target over provisioning level and a correspondence between each over provisioning level and an adjustment parameter; and an adjustment unit, configured to adjust the over provisioning space capacity of the flash device according to the target adjustment parameter.

In a first possible implementation of the second aspect of the embodiments of the present application, the receiving unit is specifically configured to: receive a write instruction from the host, determine to-be-added data according to the write instruction, add the to-be-added data to the flash device, and determine, as the size of the data that is obtained after the operation and that is saved in the flash device by the user, a size of data that is obtained after the to-be-added data is added to the flash device and that is saved by the user.

In a second possible implementation of the second aspect of the embodiments of the present application, the receiving unit is specifically configured to: receive a delete instruction from the host, determine to-be-deleted data according to the delete instruction, delete the to-be-deleted data from the flash device, and determine, as the size of the data that is obtained after the operation and that is saved in the flash device by the user, a size of data that is obtained after the to-be-deleted data is deleted and that is saved by the user.

With reference to the first possible implementation of the second aspect of the embodiments of the present application, in a third possible implementation of the embodiments of the present application, the receiving unit is further configured to compress the to-be-added data, and the to-be-added data is compressed data.

With reference to any one of the first to the third possible implementations of the second aspect of the embodiments of the present application, in a fourth possible implementation of the embodiments of the present application, the apparatus further includes:

a processing unit, configured to perform, according to a target garbage collection adjustment parameter in the target adjustment parameter, garbage collection processing on the data stored in the flash device.

With reference to any one of the first to the third possible implementations of the second aspect of the embodiments of the present application, in a fifth possible implementation of the embodiments of the present application, the processing unit is further configured to perform, according to a target wear leveling adjustment parameter in the target adjustment parameter, wear leveling processing on the data stored in the flash device.

A third aspect of the embodiments of the present application provides a flash device, including the data processing apparatus provided in the second aspect of the embodiments of the present application.

In the embodiments of the present application, an operation instruction from a host is received, an operation is performed, according to the operation instruction, on data stored in a flash device, and a size of data that is obtained after the operation and that is saved in the flash device by a user is determined. Then, a target over provisioning level is determined according to the size of the data that is obtained after the operation and that is saved in the flash device by the user and an interval that is of a user storage space capacity and that corresponds to each over provisioning level. A target adjustment parameter is determined according to the target over provisioning level and a correspondence between each over provisioning level and an adjustment parameter. Finally, an over provisioning space capacity of the flash device is adjusted according to the target adjustment parameter. Therefore, an over provisioning ratio of the flash device is dynamically adjusted according to a volume of stored data, and further, reliability and performance stability of the flash device are improved, and a service life of the flash device is prolonged.

BRIEF DESCRIPTION OF DRAWINGS

The following briefly describes the accompanying drawings used in describing the embodiments or the prior art.

DESCRIPTION OF EMBODIMENTS

The following describes the technical solutions in the embodiments of the present application with reference to the accompanying drawings.

Figure 1:
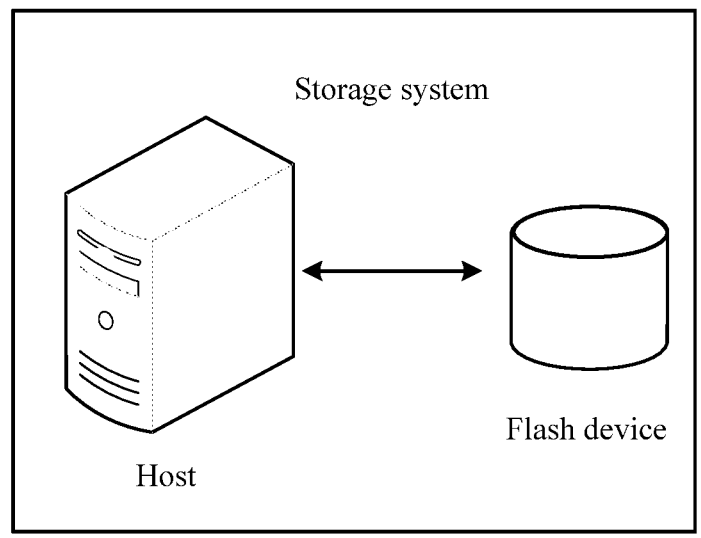
FIG. 1 is a schematic diagram of a network architecture of a storage system.

For better understanding of a data processing method and apparatus, and a flash device that are disclosed in the embodiments of the present application, the following first describes a network architecture of a storage system in the prior art. FIG. 1 is a schematic diagram of a network architecture of a storage system. The storage system shown in FIG. 1 includes a host and a flash device. It should be noted that, the storage system in the prior art includes multiple hosts and multiple flash devices, and one host and one flash device in the storage system are described in the embodiments of the present application. The host may include but is not limited to a device such as a desktop computer, a notebook computer, or a server, and the host controls the flash device by sending a series of instructions. The flash device performs a corresponding operation such as reading, writing, or deleting according to an instruction from the host. Physical storage space of the flash device includes over provisioning space and user storage space, the physical storage space is total space of the flash device, and the user storage space is used to store data input by a user by using the host. The data processing method and apparatus, and the flash device that are provided in the embodiments of the present application may be applied to the storage system shown in FIG. 1, and may be specifically applied to a scenario of adjusting over provisioning space of a flash device. The data processing apparatus in the embodiments of the present application is located in the flash device.

The flash device in the embodiments of the present application may include but is not limited to a storage device with a NAND flash, for example, a solid state drive (SSD), a removable hard disk, a floppy disk, a USB flash drive, or an SD card. It should be noted that a solid state drive in the flash memory is mainly described in the embodiments of the present application, and another flash device may also be used in the embodiments of the present application.

The solid state drive SSD mainly includes a primary controller and a NAND flash. The NAND flash is a non-volatile random access storage medium and is characterized by losing no data after the NAND flash is powered off. The NAND flash is different from a conventional volatile random access storage medium and a conventional volatile flash device such as a dynamic random access memory DRAM and a static random access memory SRAM, and therefore, may be used as an external flash device. The NAND flash is classified into two types: a single level cell (SLC) and a multi-level cell (MLC), and a main difference between the two is that they have different structures. At present, most NAND flashes on the market use an MLC chip.

A NAND flash component generally includes an internal register and a storage matrix. The storage matrix includes several blocks, each block contains several pages, and each page contains several bytes. Main operations performed on the NAND flash are reading, writing, and erasing. Because the flash device is a non-volatile semiconductor, the NAND flash is read and written in pages and is erased in blocks. A page needs to be erased before being written. A sequence of using the NAND flash is usually: erase→program→read for multiple times→erase . . . .

Over provisioning (OP) space is space in which a user cannot perform an operation and whose size is a physical space capacity of an SSD minus a user available space capacity. An OP area is usually used for an optimization operation, for example, wear leveling, garbage collection, and bad block mapping.

Wear leveling (WL) is a mechanism used to ensure that quantities of times for which all blocks are written are equal. Data in user logical address space is updated at different speeds. Data in some areas is frequently updated, but data in some areas is not frequently updated. Apparently, a flash block occupied by the data that is frequently updated is quickly worn out, while a flash block occupied by the data that is not frequently updated is less worn out. This problem can be well resolved by using the wear leveling mechanism, so that quantities of times for which all flash blocks are programmed are kept to be the same as much as possible.

Garbage collection (GC) means copying data on a valid page of a flash block to a blank block and then erasing the entire block. GC is an extremely crucial operation for an SSD, and GC efficiency has decisive impact on performance. A quantity of valid pages of the flash block has decisive impact on the GC efficiency, that is, a smaller quantity of valid pages indicates a smaller quantity of pages that need to be copied and indicates that a less time is cost, so as to improve the garbage collection efficiency.

Write amplification (WA) is a ratio of a size of data actually written into a NAND flash to a size of data written by using a host. Because the NAND flash needs to be erased before being written, during execution of these operations, user data is moved or overwritten more than once. These repeated operations not only increase a volume of written data and shorten a service life of an SSD, but also consume bandwidth of the NAND flash and indirectly affect random write performance of the SSD. For example, when data of 4 KB needs to be written, in a worst case in which a block has no clean space but has invalid data that can be erased, a primary controller reads all data to a cache and erases the block, data of the entire block is updated in the cache, and new data is written back. Write amplification resulting from this operation is: Actually writing data of 4 KB causes a write operation on the entire block (1024 KB in total), that is, a volume of written data is amplified by 256 times. At the same time, a simple one-step operation of writing the data of 4 KB becomes a four-step operation: Read from a flash memory (1024 KB)→Update in a cache (4 KB)→Erase the flash memory (1024 KB)→Write into the flash memory (1024 KB). Consequently, a delay is greatly increased, and a write speed is decreased. Therefore, write amplification is a key factor that affects the random write performance and the service life of the SSD.

Figure 2:
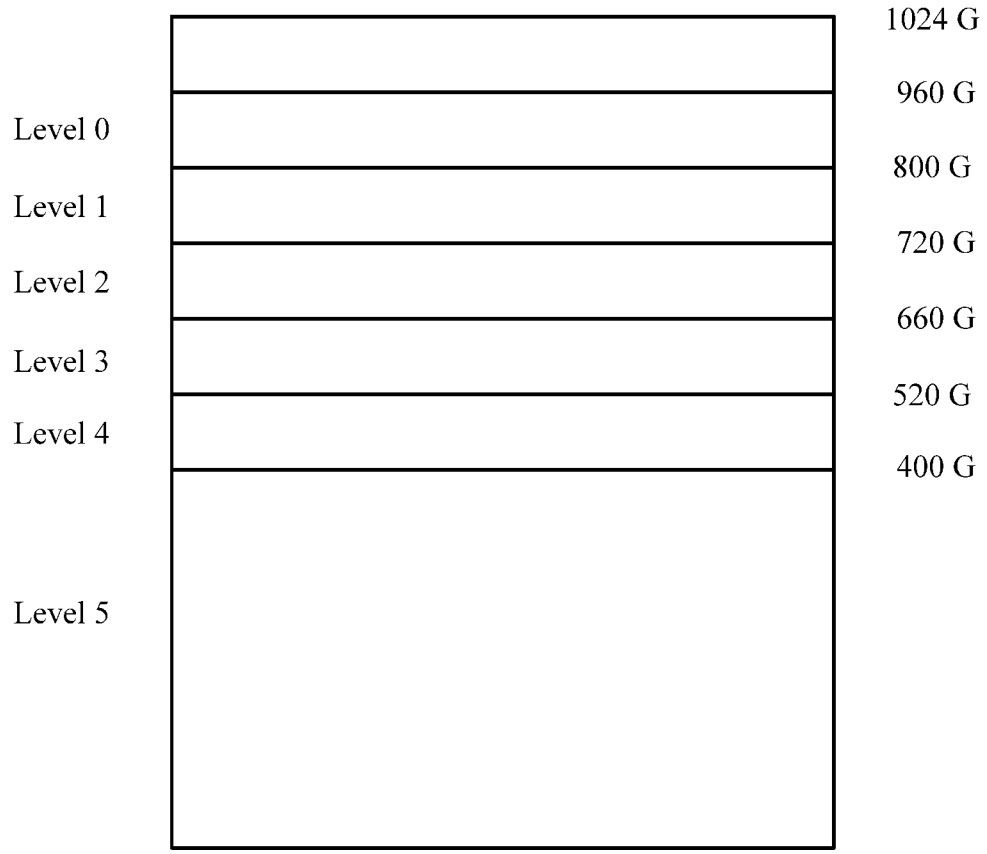
FIG. 2 is a schematic diagram of over provisioning level configuration according to an embodiment of the present application.

Multiple over provisioning levels are configured for the physical storage space of the flash device in the embodiments of the present application according to different over provisioning ratios. For details, refer to a schematic diagram of over provisioning level configuration shown in FIG. 2. It should be noted that, a value in FIG. 2 is only an example, and a specific value may be set by a manufacturer of a flash device and is not limited herein. A flash device whose physical storage space capacity is 1024 G is used as an example in FIG. 2. If an over provisioning ratio is 7%, a user storage space capacity is 960 G, and a difference 64 G between 1024 G and 960 G is an over provisioning space capacity of the flash device. In the embodiments of the present application, six over provisioning levels: a level 0, a level 1, a level 2, a level 3, a level 4, and a level 5 are configured for physical storage space 1024 G of the flash device according to different over provisioning ratios. Corresponding intervals of the user storage space capacity are respectively (800 G, 960 G], (720 G, 800 G], (660 G, 720 G], (520 G, 660 G], (400 G, 520 G], and [0 G, 400 G]. In the embodiments of the present application, a corresponding adjustment parameter is further configured for each user storage space capacity. The adjustment parameter includes parameters such as an over provisioning space adjustment parameter, a garbage collection GC adjustment parameter, a wear leveling WL adjustment parameter, a write amplification WA adjustment parameter, and hot and cold data exchange frequency. Because each over provisioning level corresponds to an interval of the user storage space capacity, and each interval of the user storage space capacity corresponds to a different adjustment parameter, a correspondence between each over provisioning level and an adjustment parameter can be derived. In the prior art, when manufacturing a flash device, a manufacturer of the flash device usually provides a fixed over provisioning ratio for a customer according to a customer requirement. Once an over provisioning ratio is fixed, it is difficult to further optimize performance, parameters, a service life, and the like of the flash device.

Figure 3:
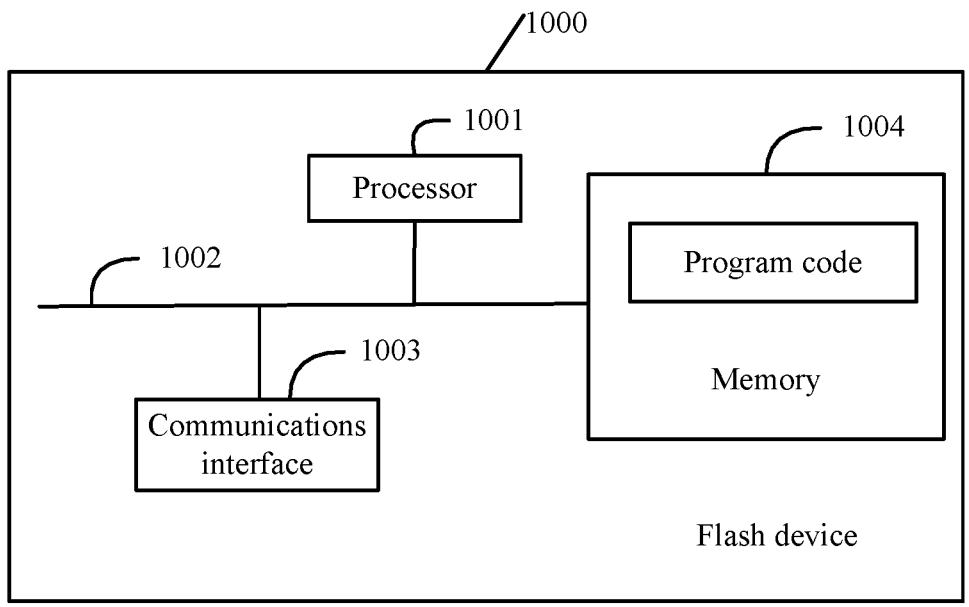
FIG. 3 is a schematic structural diagram of a flash device according to an embodiment of the present application.

Based on the network architecture shown in FIG. 1, referring to FIG. 3, FIG. 3 is a schematic structural diagram of a flash device according to an embodiment of the present application. As shown in FIG. 3, the flash device includes at least one processor 1001 such as a CPU, a communications interface 1003, a memory 1004, and at least one communications bus 1002. Optionally, the processor 1001 is a primary controller of the flash device. The communications interface 1003 is configured to receive an operation instruction from a host that is in a same storage system as the flash device. The communications bus 1002 is configured to implement connections and communication between these elements. The memory 1004 may be a NAND flash memory configured to store data. Multiple over provisioning levels are configured for physical storage space of the memory 1005 according to different over provisioning ratios. Each over provisioning level corresponds to an interval of a user storage space capacity. Each interval of the user storage space capacity corresponds to a different adjustment parameter. The over provisioning ratio is a ratio of an over provisioning space capacity to the user storage space capacity, and the over provisioning space capacity is a difference between a physical storage space capacity and the user storage space capacity.

In the following, data processing methods according to the embodiments of the present application are described in detail with reference to FIG. 3 to FIG. 5.

Figure 4:
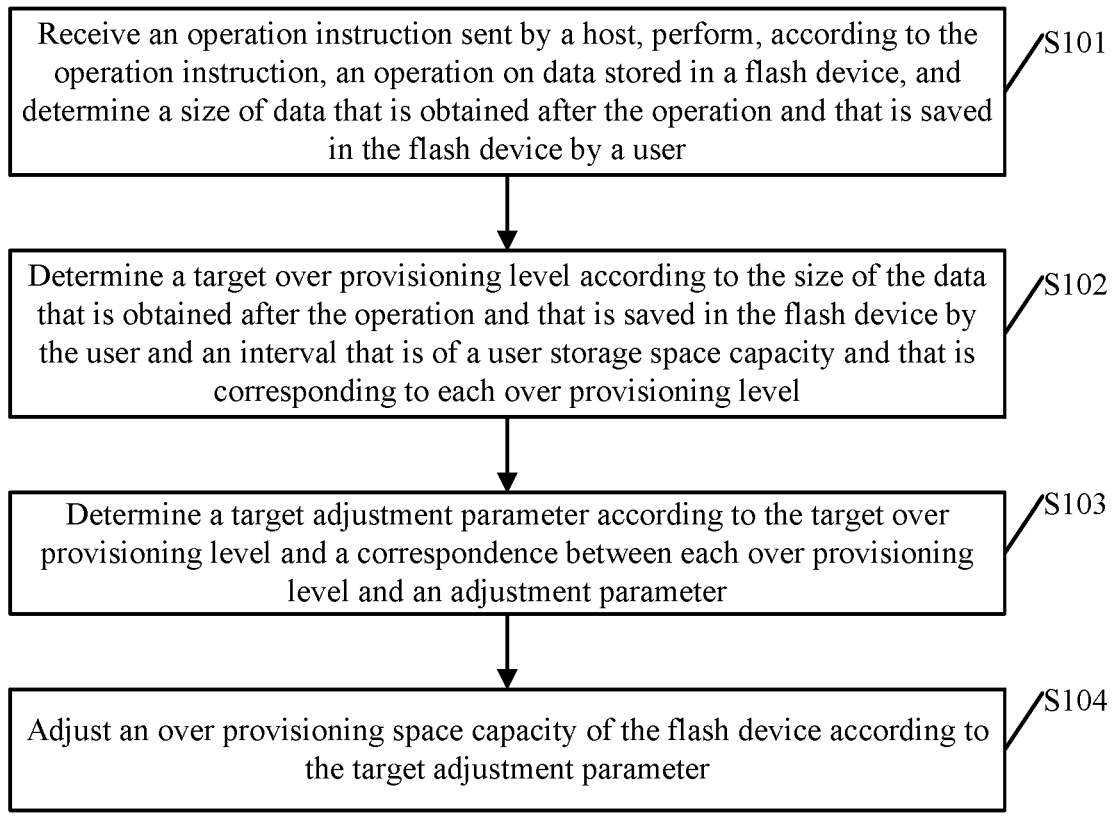
FIG. 4 is a schematic flowchart of a data processing method according to an embodiment of the present application.

Referring to FIG. 4, FIG. 4 is a schematic flowchart of a data processing method according to an embodiment of the present application. With reference to the flash device described in FIG. 3, the memory 1004 stores a group of program code, and the processor 1001 invokes the program code stored in the memory 1004 to perform the data processing method. The method may include the following step S101 to step S104.

S101. Receive an operation instruction from a host, perform, according to the operation instruction, an operation on data stored in a flash device, and determine a size of data. The data is obtained after the operation and is saved in the flash device by a user.

Optionally, the processor 1001 performs, according to the operation instruction that is from the host and that is received by the communications interface 1003, an operation on data stored in the memory 1004, and determines a size of data. The data is obtained after the operation and is saved in the memory 1004 by the user. When the communications interface 1003 receives the operation instruction, the processor 1001 first determines whether the operation instruction has been executed. If a result of the determining is no, that is, the processor 1001 has not executed the operation instruction, the operation is performed on the data stored in the memory 1004. Before the processor 1001 performs the operation, the memory 1004 may store a part of data, and this part of data is used as an initial size of data in the flash device. The initial size of data may change after the operation is performed. Therefore, the flash device needs to determine the size of the data. The data is obtained after the operation and is saved in the memory 1004 by the user. The flash device determines, according to the size of the data that is obtained after the operation and that is saved in the memory 1004 by the user, whether an over provisioning level for the flash device needs to be adjusted. If the processor 1001 has executed the operation instruction, it may be understood that the processor 1001 has performed, according to the operation instruction, the operation on the data stored in the memory 1004. In this case, no processing is performed on the flash device.

The operation instruction includes a write instruction or a delete instruction. Specifically, when the operation instruction is the write instruction, the processor 1001 first determines whether the write instruction has been executed. If no, the processor 1001 determines to-be-added data, and adds the to-be-added data to the flash device to increase the initial size of data on an original basis. The processor 1001 determines, as the size of the data, a sum of the initial size of data and a volume of the to-be-added data. The data is obtained after the operation and is saved in the memory 1004 by the user. When the operation instruction is the delete instruction, the processor 1001 first determines whether the delete instruction has been executed. If no, the processor 1001 determines to-be-deleted data, and deletes the to-be-deleted data from the memory 1004 to decrease the initial size of data on an original basis. The processor 1001 determines, as the size of the data, a difference between the initial size of data and a volume of the to-be-deleted data. The data is obtained after the operation and is saved in the memory 1005 by the user.

S102. Determine a target over provisioning level according to the size of the data that is obtained after the operation and that is saved in the flash device by the user and an interval that is of a user storage space capacity and that corresponds to each over provisioning level.

Because multiple over provisioning levels are configured for the flash device according to different over provisioning ratios, and each over provisioning level corresponds to an interval of the user storage space capacity, the processor 1001 may determine the target over provisioning level. The determination is based on the size of the data and the interval. The size of the data that is obtained after the operation and is saved in the memory 1004 by the user. The interval that is of the user storage space capacity and that corresponds to each over provisioning level. If the size of the data is 500 G, it can be learned from FIG. 2 that, a corresponding interval of the user storage space capacity is (400 G, 520 G], a corresponding over provisioning level is a level 4, and the level 4 is determined as the target over provisioning level. The data is obtained after the operation and is saved in the memory 1005 by the user. If the flash device has not been used or formatted, the target over provisioning level is set to a level 5 by default.

S103. Determine a target adjustment parameter according to the target over provisioning level and a correspondence between each over provisioning level and an adjustment parameter.

Multiple over provisioning levels can be configured for the flash device according to different over provisioning ratios. Each over provisioning level corresponds to an interval of the user storage space capacity. Each interval of the user storage space capacity corresponds to a different adjustment parameter. Therefore, the correspondence between each over provisioning level and an adjustment parameter can be derived. In other words, the flash device may configure different adjustment parameters for over provisioning levels. The processor 1001 determines the target adjustment parameter according to the target over provisioning level and the correspondence between each over provisioning level and an adjustment parameter. The target adjustment parameter may be the same as or different from an adjustment parameter used before the operation instruction is received, and is determined according to the size of the data that is obtained after the operation and that is saved in the memory 1004 by the user. If the size of the data, that is obtained after the operation and that is saved in the memory 1005 by the user, and the initial size of data belong to a same interval of the user storage space capacity, the target adjustment parameter is the same as an adjustment parameter corresponding to the initial size of data. Otherwise, the target adjustment parameter is different from an adjustment parameter corresponding to the initial size of data. Each time a size of the data saved in the memory 1005 by the user changes, the processor 1001 needs to determine a new target over provisioning level and a new target adjustment parameter. In the prior art, because there is a fixed over provisioning ratio and a fixed over provisioning space capacity, regardless of a change in the size of the data saved in the memory 1004 by the user, the processor 1001 adjusts, according to a fixed adjustment parameter, the data saved by the user. In this way, reliability and performance stability of the flash device are affected to some extent.

S104. Adjust an over provisioning space capacity of the flash device according to the target adjustment parameter.

Optionally, the processor 1001 adjusts an over provisioning space capacity of the memory 1004 according to the target adjustment parameter. In the prior art, an over provisioning space capacity of each flash device has been determined at delivery, so that processing performance of the flash device is limited to some extent. Over provisioning space of the memory 1004 in this embodiment of the present application is not fixed. It varies with the size of the data saved in the memory 1004 by the user, and the over provisioning space capacity of the memory 1004 is correspondingly adjusted according to an adjustment parameter, so that the flash device is in an optimal running state. For example, the target adjustment parameter is an adjustment parameter corresponding to a level 4, and corresponding over provisioning space in this case is adjusted to 1024 G−520 G=504 G according to the target adjustment parameter. Compared with corresponding over provisioning space 64 G of a flash device whose fixed over provisioning ratio is 7% in the prior art, the over provisioning space is increased, and this helps to reduce WA. Therefore, compared with that in the prior art, the flash device in this embodiment of the present application has higher reliability and higher performance stability.

The target adjustment parameter includes a target garbage collection adjustment parameter and a target wear leveling adjustment parameter. After adjusting the over provisioning space capacity of the memory 1004, the processor 1001 performs, according to the target garbage collection adjustment parameter, garbage collection processing on the data stored in the flash device, and performs, according to the target wear leveling adjustment parameter, wear leveling adjustment processing on the data stored in the flash device.

It should be noted that, over provisioning space in the prior art is fixed and is not accessible to a user, but the over provisioning space in this embodiment of the present application may be changed dynamically. A specific over provisioning level corresponds to fixed over provisioning space, but the over provisioning space changes when the over provisioning level is changed to another level.

In this embodiment of the present application, an operation instruction from a host is received, an operation is performed, according to the operation instruction, on data stored in a flash device, and a size of data that is obtained after the operation and that is saved in the flash device by a user is determined. Then, a target over provisioning level is determined according to the size of the data that is obtained after the operation and that is saved in the flash device by the user and an interval that is of a user storage space capacity and that is corresponding to each over provisioning level. A target adjustment parameter is determined according to the target over provisioning level and a correspondence between each over provisioning level and an adjustment parameter. Finally, an over provisioning space capacity of the flash device is adjusted according to the target adjustment parameter. Therefore, an over provisioning ratio of the flash device is dynamically adjusted according to a volume of stored data, and further, reliability and performance stability of the flash device are improved, and a service life of the flash device is prolonged.

Figure 5:
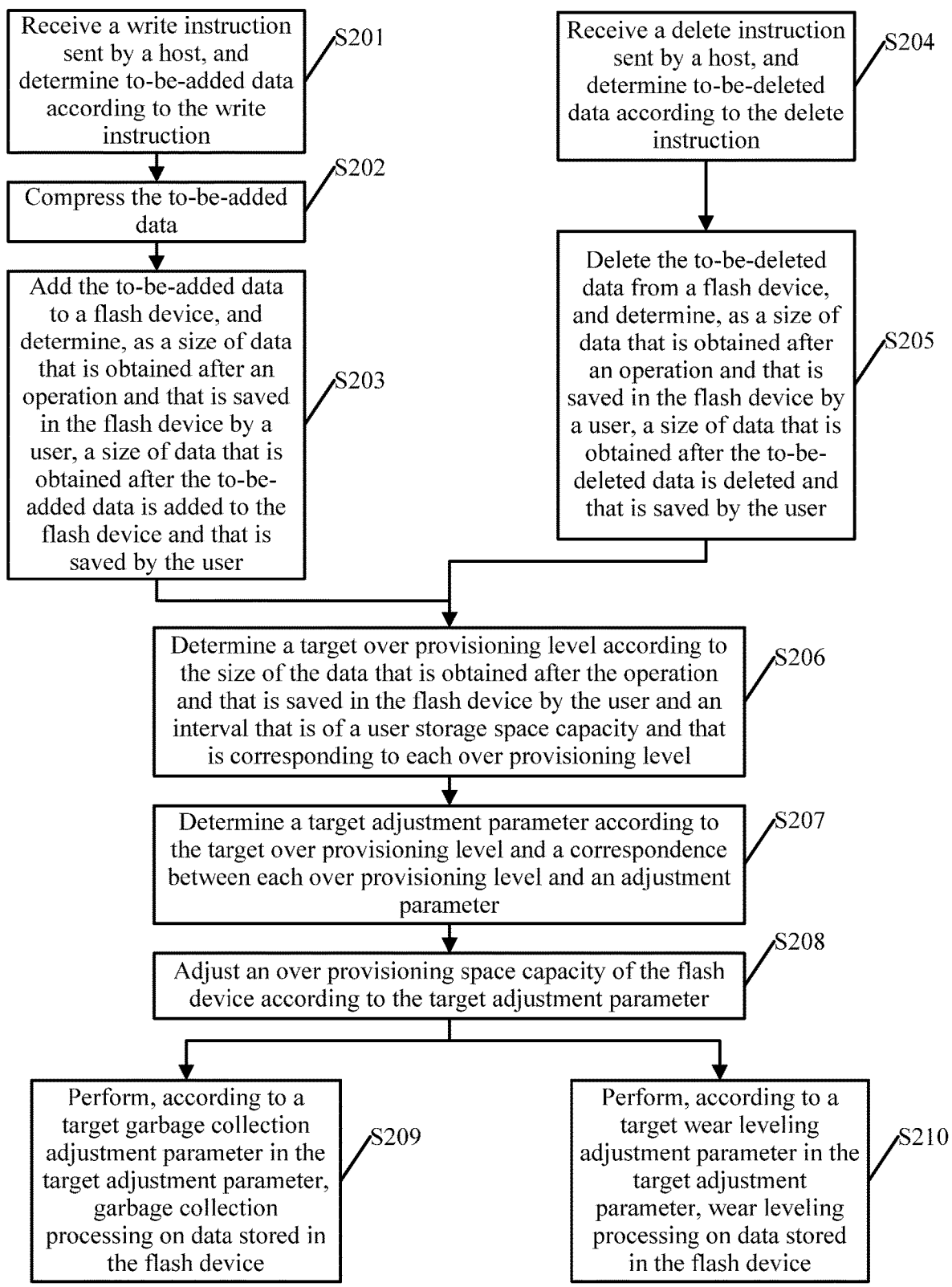
FIG. 5 is a schematic flowchart of another data processing method according to an embodiment of the present application.

Referring to FIG. 5, FIG. 5 is a schematic flowchart of another data processing method according to an embodiment of the present application. With reference to the flash device described in FIG. 3, the memory 1004 stores a group of program code, and the processor 1001 invokes the program code stored in the memory 1005 to perform the data processing method. The method may include the following step S201 to step S210.

S201. Receive a write instruction from a host, and determine to-be-added data according to the write instruction.

Optionally, the communications interface 1003 receives the write instruction from the host, and transmits the write instruction to the processor 1001 by using the communications bus 1002. The processor 1001 determines the to-be-added data according to the write instruction. When receiving the write instruction, the processor 1001 determines whether the write instruction has been executed. The host and the flash device are in a storage system, and the host controls running of the flash device, and may include but is not limited to a device such as a desktop computer, a notebook computer, or a server. Because the write instruction received by the processor 1001 may have been executed, the processor 1001 needs to determine whether the write instruction has been executed. If the write instruction has not been executed, it may be understood that the processor 1001 has not added data to the memory 1004 according to the write instruction. If the write instruction has been executed, it may be understood that the processor 1001 has added data to the memory 1004 according to the write instruction. If the write instruction is received again, a size of data stored in the memory 1004 does not change. In this case, no processing is performed on the flash device. Determining the to-be-added data includes determining content and a volume of the to-be-added data.

S202. Compress the to-be-added data.

Optionally, the processor 1001 compresses the to-be-added data. Some SSDs have a compression function, so that a size of data that is actually added by a user to an SSD is a size of data obtained after the added data is compressed. Therefore, the to-be-added data is compressed data.

It should be noted that, step S202 in this embodiment of the present application is performed when an SSD has a compression function, and if the SSD does not have the compression function, step S202 is not performed, and step S203 is directly performed.

S203. Add the to-be-added data to a flash device, and determine, as a size of data that is obtained after an operation and that is saved in the flash device by a user, a size of data that is obtained after the to-be-added data is added to the flash device and that is saved by the user.

Optionally, the processor 1001 adds the to-be-added data to the memory 1004, so as to add a new size of data to a size of data previously saved in the memory 1005 by the user. The processor 1001 determines, as a size of data that is obtained after an operation and that is saved in the memory 1004 by the user, a size of data that is obtained after the to-be-added data is added to the memory 1004 and that is saved by the user.

S204. Receive a delete instruction from a host, and determine to-be-deleted data according to the delete instruction.

Optionally, the processor 1001 receives the delete instruction from the host, and transmits the delete instruction to the processor 1001 by using the communications bus 1002.

The processor 1001 determines the to-be-deleted data according to the delete instruction. When receiving the delete instruction, the processor 1001 determines whether the delete instruction has been executed. The delete instruction is a trim instruction. A prerequisite for implementing this embodiment of the present application is that the flash device can support the trim instruction. The trim instruction is used by an operating system to inform, after a file is deleted or formatting is performed, a primary controller of an SSD that this data block is no longer needed. When some files are deleted or an entire partition is formatted, the operating system sends, to the primary controller of the SSD, the trim instruction together with a logical address (including an invalid data address) that is updated during an operation. In this way, in subsequent garbage collection processing, invalid data can be wiped, so that a user storage space capacity and an over provisioning space capacity are correspondingly increased, write amplification WA is reduced, and performance is improved. According to this embodiment of the present application, the host is further required to deliver as many trim instructions as possible, so that the flash device can reversely adjust an over provisioning level. Because the delete instruction received by the processor 1001 may have been executed, the processor 1001 needs to determine whether the delete instruction has been executed. If the delete instruction has not been executed, it may be understood that the processor 1001 has not deleted data from the flash device according to the delete instruction. If the delete instruction has been executed, it may be understood that the processor 1001 has deleted, according to the delete instruction, data from the memory 1004. If the delete instruction is received again, a size of data stored in the memory 1004 does not change. In this case, no processing is performed on the flash device. Determining the to-to-deleted data includes determining content and a volume of the to-be-deleted data, which may be understood as determining data that needs to be invalidated or a data block that needs to be erased.

S205. Delete the to-be-deleted data from a flash device, and determine, as a size of data that is obtained after an operation and that is saved in the flash device by a user, a size of data that is obtained after the to-be-deleted data is deleted and that is saved by the user.

Optionally, the processor 1001 deletes the to-be-deleted data from the memory 1005, so as to decrease a size of data from a size of data previously saved in the memory 1005 by the user. The processor 1001 determines, as a size of data that is obtained after an operation and that is saved in the memory 1004 by the user, the size of the data that is obtained after the to-be-deleted data is deleted and that is saved by the user.

S206. Determine a target over provisioning level according to the size of the data that is obtained after the operation and that is saved in the flash device by the user and an interval that is of a user storage space capacity and that corresponds to each over provisioning level.

S207. Determine a target adjustment parameter according to the target over provisioning level and a correspondence between each over provisioning level and an adjustment parameter.

S208. Adjust an over provisioning space capacity of the flash device according to the target adjustment parameter.

For a specific implementation process of step S206 to step S208 in this embodiment of the present application, refer to the specific descriptions of step S102 to step S104 in the embodiment shown in FIG. 3. Details are not further described herein.

S209. Perform, according to a target garbage collection adjustment parameter in the target adjustment parameter, garbage collection processing on data stored in the flash device.

Optionally, the processor 1001 performs, according to the target garbage collection adjustment parameter in the target adjustment parameter, garbage collection processing on the data stored in the flash device. Garbage collection is: A primary controller of an SSD combines all "valid" data in those blocks including "invalid" data, puts combined data to a new "blank block", and deletes an "invalid" data block to increase a quantity of spare "blank blocks". It can be learned that, by means of garbage collection, not only a volume of invalid data is reduced, but a quantity of blank blocks is also increased, so that more available blank blocks are provided for the user.

Because garbage collection generates a large amount of load on an SSD, garbage collection may be classified into idle garbage collection and passive garbage collection. Idle garbage collection means that a primary controller of an SSD performs a garbage collection operation in advance when a system is idle, to generate a specific quantity of blank blocks, so that a garbage collection operation does not obviously affect user experience. However, a disadvantage is that extra write amplification is caused because valid data just obtained by means of garbage collection may become invalid due to updating performed by a user. Passive garbage collection is enabled in all SSDs. Primary controller performance of an SSD has decisive impact on efficiency of passive garbage collection, because the SSD in this case needs to simultaneously perform garbage collection and a data operation that is required by the user. When the primary controller performance is poor, the user finds that performance of the SSD deteriorates. Passive garbage collection means performing a garbage collection operation according to a trim instruction from an associated host, so as to trigger the SSD to generate more data on an invalid page, relieve pressure of garbage collection, and reduce an opportunity that the user finds that the performance of the SSD deteriorates.

A garbage collection adjustment parameter is used for determining when to perform a garbage collection processing operation on the flash device, that is, the garbage collection adjustment parameter is a parameter used for starting garbage collection. In the prior art, in a case of a fixed over provisioning ratio, regardless of a size of data stored in an SSD, garbage collection processing is performed on the SSD according to a fixed garbage collection parameter, and consequently, performance and reliability of the SSD are affected. Because optimal adjustment parameters are separately configured for different space over provisioning levels in this embodiment of the present application, appropriate garbage collection processing can be performed according to a volume of stored data in this embodiment of the present application, so as to optimize performance of the SSD.

S210. Perform, according to a target wear leveling adjustment parameter in the target adjustment parameter, wear leveling processing on data stored in the flash device.

Optionally, the processor 1001 performs, according to the target wear leveling adjustment parameter in the target adjustment parameter, wear leveling processing on the data stored in the flash device, to ensure that quantities of times for which all blocks are written are equal. There are two types of wear leveling algorithms: a dynamic wear leveling algorithm and a static wear leveling algorithm. In brief, dynamic wear leveling means using a newest flash block each time instead of using an old flash block. Static wear leveling means moving old data that has not been modified for a long time out of a new flash block and saving the old data in an oldest flash block, so that the new flash block can be frequently used again. Both static wear leveling and static wear leveling need a start granularity. A wear leveling adjustment parameter is a parameter used for determining when to start a wear leveling processing operation. Each over provisioning level corresponds to a different wear leveling adjustment parameter, and an over provisioning level corresponding to a larger over provisioning ratio corresponds to a larger start granularity.

In this embodiment of the present application, an operation instruction from a host is received, an operation is performed, according to the operation instruction, on data stored in a flash device. A size of data that is obtained after the operation and that is saved in the flash device by a user is determined. Then, a target over provisioning level is determined according to the size of the data and an interval that is of a user storage space capacity and that corresponds to each over provisioning level. The data is obtained after the operation and that is saved in the flash device by the user. A target adjustment parameter is determined according to the target over provisioning level and a correspondence between each over provisioning level and an adjustment parameter.

Finally, an over provisioning space capacity of the flash device is adjusted according to the target adjustment parameter, and the flash device is correspondingly adjusted according to the target adjustment parameter. Therefore, an over provisioning ratio of the flash device is dynamically adjusted according to a volume of stored data, and further, reliability and performance stability of the flash device are improved, a service life of the flash device is prolonged, and proactivity of the flash device is improved.

Figure 6:
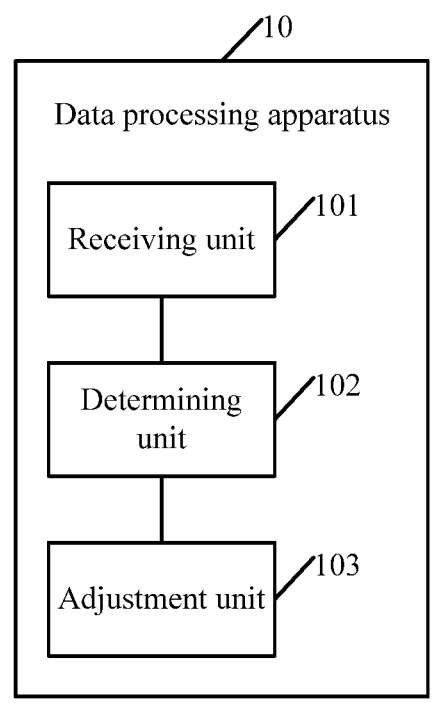
FIG. 6 is a schematic structural diagram of a data processing apparatus according to an embodiment of the present application.

In the following, a data processing apparatus according to an embodiment of the present application is described in detail with reference to FIG. 6. It should be noted that the data processing apparatus shown in FIG. 6 is configured to perform the methods in the embodiments shown in FIG. 4 and FIG. 5. For ease of description, only a part related to this embodiment of the present application is shown. For undisclosed specific technical details, refer to the embodiments shown in FIG. 4 and FIG. 5 of the present application.

The data processing apparatus in this embodiment of the present application is applied to a flash device in the storage system shown in FIG. 1. Multiple over provisioning levels are configured for physical storage space of the flash device according to different over provisioning ratios. Each over provisioning level corresponds to an interval of a user storage space capacity. Each interval of the user storage space capacity corresponds to a different adjustment parameter. The over provisioning ratio is a ratio of an over provisioning space capacity to the user storage space capacity, and the over provisioning space capacity is a difference between a physical storage space capacity and the user storage space capacity.

Referring to FIG. 6, FIG. 6 is a schematic structural diagram of a data processing apparatus 10 according to an embodiment of the present application. The data processing apparatus 10 may include a receiving unit 101, a determining unit 102, and an adjustment unit 103.

The receiving unit 101 is configured to: receive an operation instruction from a host, perform, according to the operation instruction, an operation on data stored in a flash device, and determine a size of data that is obtained after the operation and that is saved in the flash device by a user.

The determining unit 102 is configured to determine a target over provisioning level according to the size of the data that is obtained after the operation and that is saved in the flash device by the user and an interval that is of a user storage space capacity and that corresponds to each over provisioning level.

The determining unit 102 is further configured to determine a target adjustment parameter according to the target over provisioning level and a correspondence between each over provisioning level and an adjustment parameter.

The adjustment unit 103 is configured to adjust an over provisioning space capacity of the flash device according to the target adjustment parameter.

This embodiment of the present application and the method embodiment shown in FIG. 4 are based on a same concept, and produce a same technical effect. For a specific principle, refer to the description in the embodiment shown in FIG. 4, and details are not further described herein.

Optionally, the receiving unit 101 is specifically configured to: receive a write instruction from the host, determine to-be-added data according to the write instruction, and add the to-be-added data to the flash device. The receiving unit 101 determines, as the size of the data that is obtained after the operation and that is saved in the flash device by the user, a size of data that is obtained after the to-be-added data is added to the flash device and that is saved by the user.

The receiving unit 101 is specifically configured to: receive a delete instruction from the host, determine to-be-deleted data according to the delete instruction, delete the to-be-deleted data from the flash device, and determine, as the size of the data that is obtained after the operation and that is saved in the flash device by the user, a size of data that is obtained after the to-be-deleted data is deleted and that is saved by the user.

The receiving unit 101 is further configured to compress the to-be-added data, and the to-be-added data is compressed data.

The data processing apparatus 10 further includes:

a processing unit, configured to perform, according to a target garbage collection adjustment parameter in the target adjustment parameter, garbage collection processing on the data stored in the flash device.

The processing unit is further configured to perform, according to a target wear leveling adjustment parameter in the target adjustment parameter, wear leveling processing on the data stored in the flash device.

This embodiment of the present application and the method embodiment shown in FIG. 5 are based on a same concept, and produce a same technical effect. For a specific principle, refer to the description in the embodiment shown in FIG. 5, and details are not further described herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely examples of embodiments of the present application, and certainly is not intended to limit the protection scope of the present application. Therefore, equivalent variations made in accordance with the claims of the present application shall fall within the scope of the present application.

What is claimed is:

1. A method for adjusting storage spaces in a flash device, wherein the flash device comprises a data storage space for storing user data and an over provisioning space, the method comprising:
    receiving, by a controller of the flash device, an operation instruction from a host device coupled to the flash device;
    performing, by the controller, an operation on the user data stored in the data storage space according to the operation instruction, wherein before performing the operation, the data storage space already stores the user data having an initial size;
    determining, by the controller, a changed size of the user data after performing the operation;
    identifying, by the controller, a target over provisioning level according to the changed size of the user data, wherein the target over provisioning level is one of a plurality of different over provisioning levels preset for the flash device; and
    adjusting, by the controller, capacities of the data storage space and the over provisioning space according to the target over provisioning level.

2. The method according to claim 1, wherein adjusting the capacities of the data storage space and the over provisioning space comprises:
    when the changed size of the user data is larger than the initial size of the user data, and a difference between the changed size of the user data and a capacity of the data storage space is smaller than a first adjustment threshold, increasing the capacity of the data storage space and decreasing the capacity of the over provisioning space; and
    when the changed size of the user data is smaller than the initial size of the user data, and a difference between the changed size of the user data and the capacity of the data storage space is larger than a second adjustment threshold, decreasing the capacity of the data storage space and increasing the capacity of the over provisioning space.

3. The method according to claim 1, wherein each over provisioning level corresponds to an adjustment parameter, and wherein adjusting the capacities of the data storage space and the over provisioning space according to the target over provisioning level comprises:
    determining a target adjustment parameter based on the target over provisioning level; and
    adjusting the capacities of the data storage space and the over provisioning space according to the target adjustment parameter.

4. The method according to claim 3, wherein the target adjustment parameter comprises an over provisioning space adjustment parameter, and adjusting the capacities of the data storage space and the over provisioning space according to the target adjustment parameter comprises:
    adjusting the capacity of the over provisioning space capacity according to the over provisioning space adjustment parameter.

5. The method according to claim 4, wherein the target adjustment parameter further comprises a garbage collection adjustment parameter, and wherein the method further comprises:
    performing, by the controller according to the garbage collection adjustment parameter, garbage collection on the user data.

6. The method according to claim 4, wherein the target adjustment parameter further comprises a wear leveling adjustment parameter, and wherein the method further comprises:
    performing, by the controller according to the wear leveling adjustment parameter, wear leveling on the user data.

7. The method according to claim 1, wherein the operation instruction includes a write instruction comprising to-be-added data, wherein performing the operation on the user data stored in the data storage space comprises:
    writing the to-be-added data into the data storage space, wherein the changed size of the user data equals to the initial size of the user data plus a size of the to-be-added data.

8. The method according to claim 1, wherein the operation instruction includes a delete instruction comprising to-be-deleted data, wherein performing the operation on the user data stored in the data storage space comprises:
    deleting the to-be-deleted data from the data storage space,
wherein the changed size of the user data equals to the initial size of the user data minus a size of the to-be-deleted data.

9. A flash device, comprising:
    a storage medium providing storage space, and a controller;
wherein the storage space includes a data storage space for storing user data and an over provisioning space;
wherein the controller is configured to:

receive an operation instruction from a host device coupled to the flash device;

perform an operation on the user data stored in the data storage space according to the operation instruction, wherein before performing the operation, the data storage space already stores the user data having an initial size;

determine a changed size of the user data after performing the operation;

identify a target over provisioning level according to the changed size of the user data, wherein the target over provisioning level is one of a plurality of different over provisioning levels preset for the flash device; and adjust the capacities of the data storage space and the over provisioning space according to the target over provisioning level.

10. The flash device according to claim 9, wherein in adjusting the capacities of the data storage space and the over provisioning space, the controller is configured to:

when the changed size of the user data is larger than the initial size of the user data, and a difference between the changed size of the user data and a capacity of the data storage space is smaller than a first adjustment threshold, increase the capacity of the data storage space and decrease the capacity of the over provisioning space; and when the changed size of the user data is smaller than the initial size of the user data, and a difference between the changed size of the user data and the capacity of the data storage space is larger than a second adjustment threshold, decrease the capacity of the data storage space and increase the capacity of the over provisioning space.

11. The flash device according to claim 9, wherein each over provisioning level corresponds to an adjustment parameter, and wherein in adjusting the capacities of the data storage space and the over provisioning space according to the target over provisioning level, the controller is configured to:

determine a target adjustment parameter based on the target over provisioning level; and adjust the capacities of the data storage space and the over provisioning space according to the target adjustment parameter.

12. The flash device according to claim 11, wherein the target adjustment parameter comprises an over provisioning space adjustment parameter, and wherein in adjusting the capacities of the data storage space and the over provisioning space, the controller is configured to:

adjust the capacity of the over provisioning space capacity according to the over provisioning space adjustment parameter.

13. The flash device according to claim 12, wherein the target adjustment parameter further comprises a garbage collection adjustment parameter, and wherein the controller is further configured to:

perform, according to the garbage collection adjustment parameter, garbage collection on the user data.

14. The flash device according to claim 12, wherein the target adjustment parameter further comprises a wear leveling adjustment parameter, and wherein the controller is further configured to:

perform, according to the wear leveling adjustment parameter, wear leveling on the user data.

15. The flash device according to claim 9, wherein the operation instruction includes a write instruction comprising to-be-added data, wherein in performing the operation on the user data stored in the data storage space, the controller is configured to:

write the to-be-added data into the data storage space, wherein the changed size of the user data equals to the initial size of the user data plus a size of the to-be-added data.

16. The flash device according to claim 9, wherein the operation instruction includes a delete instruction comprising to-be-deleted data, wherein in performing the operation on the user data stored in the data storage space, the controller is configured to:

delete the to-be-deleted data from the data storage space, wherein the changed size of the user data equals to the initial size of the user data minus a size of the to-be-deleted data.

17. A method for adjusting storage spaces in a flash device, wherein the flash device comprises a data storage space for storing user data and an over provisioning space, the method comprising:

receiving, by a controller of the flash device, a write data request from a host device coupled to the flash device, wherein the write data request includes target data to be stored in the data storage space;

writing, by the controller, the target data into the data storage space according to the write data request;

determining, by the controller, a total size of the user data in the storage space after the target data is written to the storage space;

identifying, by the controller, a target over provisioning level according to the total size of the user data, wherein the target over provisioning level is one of a plurality of different over provisioning levels preset for the flash device; and adjusting, by the controller, capacities of the data storage space and the over provisioning space according to the target over provisioning level.

18. The method according to claim 17, wherein adjusting the capacities of the data storage space and the over provisioning space according to the total size of the user data comprises:

when a difference between the total size of the user data and a capacity of the data storage space is smaller than a first adjustment threshold, increase the capacity of the data storage space and decrease the capacity of the over provisioning space; and when the difference between the total size of the user data and the capacity of the data storage space is larger than a second adjustment threshold, decrease the capacity of the data storage space and increase the capacity of the over provisioning space.

19. A flash device, comprising:

a storage medium providing storage space, and a controller;

wherein the storage space includes a data storage space for storing user data and an over provisioning space;

wherein the controller is configured to:

receive a write data request from a host device coupled to the flash device, wherein the write data request includes target data to be stored in the data storage space;

write the target data into the data storage space according to the write data request;

determine a total size of the user data in the storage space after the target data is written to the storage space;

identify a target over provisioning level according to the total size of the user data, wherein the target over provisioning level is one of a plurality of different over provisioning levels preset for the flash device; and adjust capacities of the data storage space and the over provisioning space according to the determined target over provisioning level.

20. The flash device according to claim 19, wherein in adjusting the capacities of the data storage space and the over provisioning space according to the total size of the user data, the controller is configured to:
  when a difference between the total size of the user data and a capacity of the data storage space is smaller than a first adjustment threshold, increase the capacity of the data storage space and decrease the capacity of the over provisioning space; and
  when the difference between the total size of the user data and the capacity of the data storage space is larger than a second adjustment threshold, decrease the capacity of the data storage space and increase the capacity of the over provisioning space.

* * * * *